(12) United States Patent
Xing et al.

(10) Patent No.: US 11,470,336 B2
(45) Date of Patent: Oct. 11, 2022

(54) METHOD FOR TRANSCODING VIDEO AND RELATED ELECTRONIC DEVICE

(71) Applicant: BEIJING BAIDU NETCOM SCIENCE AND TECHNOLOGY CO., LTD., Beijing (CN)

(72) Inventors: Huaifei Xing, Beijing (CN); Yanlong Chang, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 10 days.

(21) Appl. No.: 17/129,476

(22) Filed: Dec. 21, 2020

(65) Prior Publication Data

US 2021/0409741 A1    Dec. 30, 2021

(30) Foreign Application Priority Data

Jun. 29, 2020 (CN) .......................... 202010611335.2

(51) Int. Cl.
| | | |
|---|---|---|
| H04N 19/40 | (2014.01) |
| H04N 19/119 | (2014.01) |
| H04N 19/132 | (2014.01) |
| H04N 19/149 | (2014.01) |
| H04N 19/172 | (2014.01) |

(52) U.S. Cl.
CPC .......... *H04N 19/40* (2014.11); *H04N 19/119* (2014.11); *H04N 19/132* (2014.11); *H04N 19/149* (2014.11); *H04N 19/172* (2014.11)

(58) Field of Classification Search
CPC ..................................................... H04N 19/40
USPC ..................................................... 375/240.26
See application file for complete search history.

(56) References Cited

U.S. PATENT DOCUMENTS

| | | | |
|---|---|---|---|
| 2009/0238134 A1* | 9/2009 | Shiizaki | .............. H04L 25/0236 370/476 |
| 2014/0321532 A1 | 10/2014 | Ghat et al. | |
| 2018/0338146 A1 | 11/2018 | John | |
| 2019/0364290 A1 | 11/2019 | Qin et al. | |

(Continued)

FOREIGN PATENT DOCUMENTS

| | | |
|---|---|---|
| CN | 110769278 A | 2/2020 |
| JP | 2004357002 A | 12/2004 |
| JP | 2008193661 A | 8/2008 |

OTHER PUBLICATIONS

Extended European Search Report for EP Application No. 20215139.5, dated May 25, 2021, 10 pages.

(Continued)

*Primary Examiner* — Yulin Sun
(74) *Attorney, Agent, or Firm* — Fay Sharpe LLP

(57) ABSTRACT

Embodiments of the present disclosure provide a method for transcoding a video. An input attribute of a video is obtained and a target attribute is obtained. A segment transcoding speed of the video is determined based on the input attribute and the target attribute. The segment transcoding speed indicates a transcoding speed of a video segment. The number of video segments of the video is determined based on a preset target transcoding speed and the segment transcoding speed. The video is segmented based on a video length of the video and the number of video segments to obtain the video segments. The video segments are transcoded based on the segment transcoding speed.

18 Claims, 5 Drawing Sheets

(56) References Cited

U.S. PATENT DOCUMENTS

2020/0099973 A1* 3/2020 Mizutani .......... H04N 21/25825
2020/0145024 A1* 5/2020 Wang .................... H04L 1/0058
2020/0235759 A1* 7/2020 Ye ......................... H03M 13/09
2020/0389249 A1* 12/2020 Wang .................... H04L 1/0002

OTHER PUBLICATIONS

Tewodors Deneke et al., "Video Transcoding Time Prediction for Proactive Loan Balancing", Abo Akademi University, Finland; Turku Centre for Computer Science, Finland.
Jing-Chen Huang et al., "On High Efficient Cloud Video Transcoding", 2015 International Symposium on Intelligent Signal Processing and Communication Systems (ISPACS), Nov. 9-12, 2015.
Office Action for Japanese Application No. 2020-215674, dated Feb. 22, 2022, 2 pages.

* cited by examiner

METHOD FOR TRANSCODING VIDEO AND RELATED ELECTRONIC DEVICE

CROSS REFERENCE TO RELATED APPLICATIONS

This application claims priority and benefits to Chinese Application No. 202010611335.2, filed on Jun. 29, 2020, the entire content of which is incorporated herein by reference.

FIELD

Embodiments of the present disclosure relate to a field of computer technologies and particularly to a field of cloud computing, deep learning and video processing technologies, and especially relate to a method and an apparatus for transcoding a video, a device, and a medium.

BACKGROUND

Video transcoding is widely used in a field, such as broadcast television, Internet video, and live video, which provides a user with a live or VOD (video on demand) service. The video transcoding mainly refers to conversion the video from a video coding format to another video coding format (also referred as a target coding format). A bandwidth during transmitting a video may be reduced after the video transcoding is performed, thereby reducing a distribution cost.

SUMMARY

Embodiments of the disclosure provide a method for transcoding a video. The method includes: obtaining an input attribute of a video to be transcoded and a target attribute; determining a segment transcoding speed of the video to be transcoded based on the input attribute and the target attribute, the segment transcoding speed indicating a transcoding speed of a video segment obtained by segmenting the video to be transcoded; determining the number of video segments of the video to be transcoded based on a preset target transcoding speed of the video to be transcoded and the segment transcoding speed; segmenting the video to be transcoded based on a video length of the video to be transcoded and the number of video segments to obtain the video segments; and transcoding the video segments based on the segment transcoding speed.

Embodiments of the disclosure further provide an electronic device. The electronic device includes at least one processor and a memory. The memory is communicatively coupled to the at least one processor. The memory is configured to store instructions executed by the at least one processor. When the instructions are executed by the at least one processor, the at least one processor is caused to execute a method for transcoding a video described above.

Embodiments of the disclosure further provide a non-transitory computer readable storage medium. The non-transitory computer readable storage medium has computer instructions stored thereon. The computer instructions are configured to enable a computer to execute a method for transcoding a video described above.

It should be understood that, description in Summary of the present disclosure does not aim to limit a key or important feature in embodiments of the present disclosure, and does not used to limit the scope of the present disclosure. Other features of the present disclosure will be easily understood by following descriptions.

BRIEF DESCRIPTION OF THE DRAWINGS

The accompanying drawings are used for better understanding the solution and do not constitute a limitation of the present disclosure.

DETAILED DESCRIPTION

Description will be made below to exemplary embodiments of the present disclosure with reference to accompanying drawings, which includes various details of embodiments of the present disclosure to facilitate understanding and should be regarded as merely examples. Therefore, it should be recognized by the skilled in the art that various changes and modifications may be made to the embodiments described herein without departing from the scope and spirit of the present disclosure. Meanwhile, for clarity and conciseness, descriptions for well-known functions and structures are omitted in the following description.

Presently, in order to improve a transcoding speed, an existing video transcoding solution adopts a strategy for segmenting a video into a preset number of video segments. For example, all videos are segmented into the same number of video segments and each video segment is transcoded. However, due to differences of various videos, the strategy of segmenting the video into the preset number of video segments may be unsuitable to all videos, causing reduction of the video transcoding efficiency.

Therefore, embodiments of the disclosure provide a method and an apparatus for transcoding a video, a related electronic device and a related storage medium.

Figure 1:
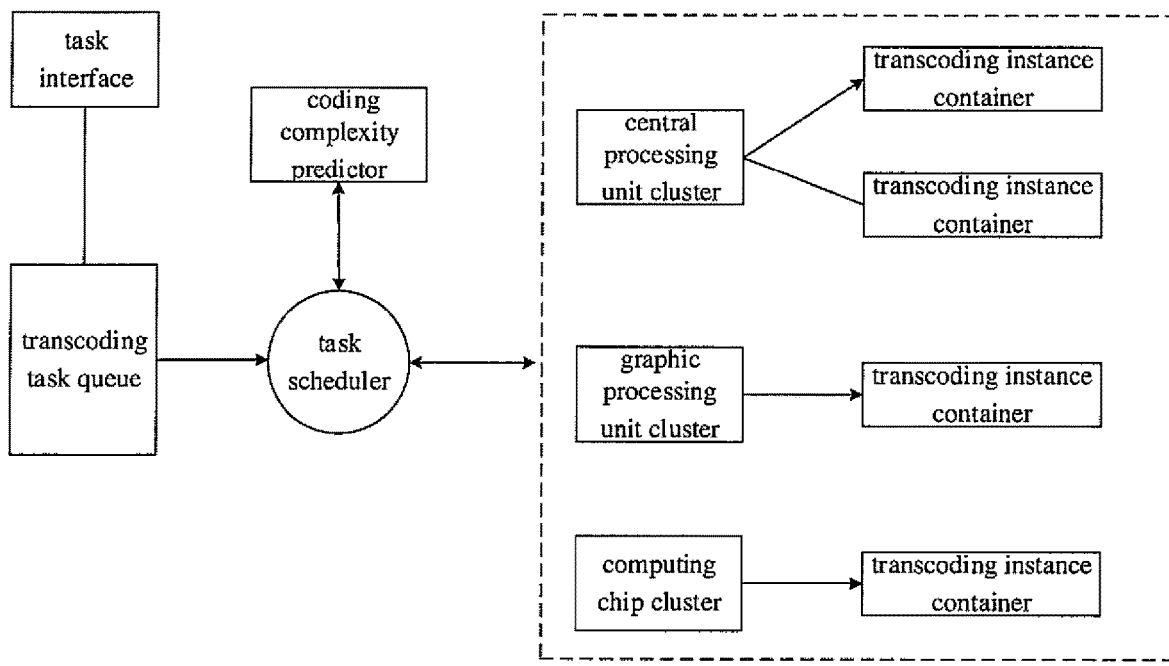
FIG. 1 is a schematic diagram illustrating a method for transcoding a video according to embodiments of the present disclosure.

FIG. 1 is a schematic diagram illustrating a method for transcoding a video according to embodiments of the present disclosure. As illustrated in FIG. 1, during the video transcoding, video transcoding tasks may be continuously obtained via a task interface (such as a Console/API (application programming interface)) and added to a transcoding task queue. A video transcoding task to be processed is called from the transcoding task queue by utilizing a task scheduler based on a preset task scheduling strategy. Available computing resources are called to execute the video transcoding task, thereby improving a task processing efficiency. The preset task scheduling strategy may include, but be not limited to, preferentially executing a video transcoding task with a higher priority based on preset priorities of the video transcoding tasks; or preferentially executing a video transcoding task with a lower complexity based on complexities of the video transcoding tasks. As illustrated in_

FIG. 1, the complexities of the video transcoding tasks may be predicted by utilizing a coding complexity predictor.

In some embodiments of the present disclosure, before the video transcoding task is executed, computing resources of the computing device may be managed and divided in advance to form multiple transcoding instance containers. In this way, the video transcoding tasks may be executed by the multiple transcoding instance containers respectively. The multiple transcoding instance containers may be not influenced by each other, such that a distributed processing of the video transcoding tasks is implemented and the video transcoding efficiency is improved. As illustrated in FIG. 1, the multiple transcoding instance containers may be obtained through the division based on an idle CPU (central processing unit) cluster, an idle GPU (graphic processing unit) cluster and an available computing chip (such as a FPGA chip) cluster of the computing device. The number of transcoding instance containers may be set based on actually available resources. The number of transcoding instance containers illustrated in FIG. 1 should not be understood as a limitation to embodiments of the present disclosure. Description will be made below to transcoding each video to be transcoded according to embodiments of the present disclosure.

Figure 2:
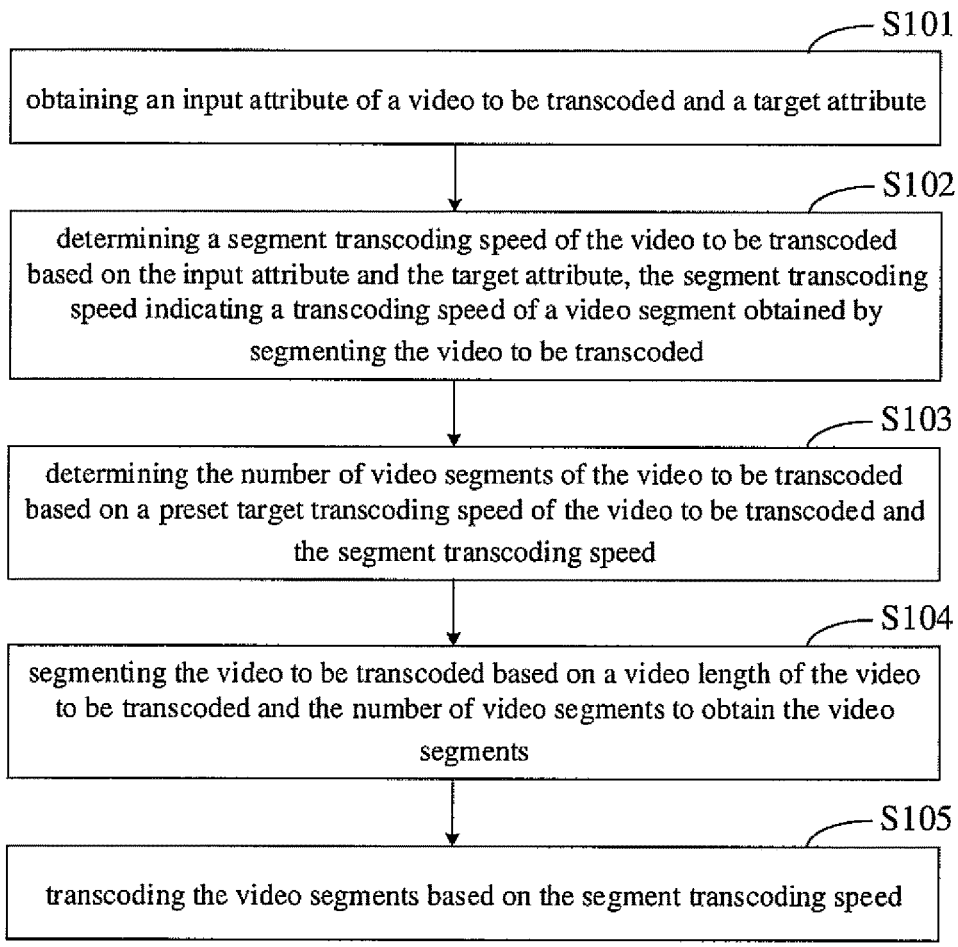
FIG. 2 is a flow chart illustrating a method for transcoding a video according to embodiments of the present disclosure.

FIG. 2 is a flow chart illustrating a method for transcoding a video according to embodiments of the present disclosure. The method may be applicable to transcode a video. In detail, the method may be applicable to video cloud transcoding. That is, a cloud computing infrastructure is employed for the video transcoding. The method according to embodiments of the present disclosure may be executed by an apparatus for transcoding a video. The apparatus may be implemented by software and/or hardware, and may be integrated on any electronic device with a computing capability, such as a server.

As illustrated in FIG. 2, the method for transcoding a video according to embodiments of the present disclosure may include the following.

At block S101, an input attribute of a video to be transcoded and a target attribute are obtained.

The input attribute of the video to be transcoded refers to attributes of the video to be transcoded, which may be determined by analyzing attributes of the video to be transcoded with a video analysis technology. For example, the input attribute includes at least one of resolution, code rate, encoder type, and complexity of a preset number of video pictures. The complexity includes a temporal complexity and a spatial complexity. The encoder type may include an encoder standard of an encoder for encoding the video to be transcoded, such as H.264, H.265, VP9 or AV1. The temporal complexity may be used to represent a time variation of a sequence of video pictures. The spatial complexity may be used to represent a texture complexity of a video picture (also called as a frame). For example, a preset number of video pictures may be periodically extracted from the video to be transcoded based on a time sequence. Referring to an existing algorithm for obtaining the temporal complexity and the spatial complexity, the temporal complexity and the spatial complexity of the extracted video pictures are obtained and used as the input attribute of the video to be transcoded.

The target attribute, also referred as transcoding parameters for obtaining a transcoded video, may be preset depending on a transcoding requirement or a quality of the transcoded video. The target attribute includes at least one of resolution, code rate, encoder type, and the number of key pictures. The key pictures may include I pictures, P pictures and B pictures in the video. In some embodiments, the target attribute may include the number of B pictures.

A processing speed of transcoding the video may be affected by all attributes of the video. Therefore, in embodiments of the present disclosure, the input attribute of the video to be transcoded and the target attribute are taken into consideration as a factor for accurately determining a segment transcoding speed of the video to be transcoded, thereby providing a foundation for setting the number of video segments.

At block S102, a segment transcoding speed of the video to be transcoded is determined based on the input attribute and the target attribute. The segment transcoding speed indicates a transcoding speed of a video segment. The video segment is a segment of the video obtained by segmenting the video to be transcoded.

In detail, a predetermined mapping relationship among input attributes of videos, target attributes and segment transcoding speeds may be utilized to determine the segment transcoding speed of a current video to be transcoded. The transcoding speed may also be called as a transcoding velocity. The mapping relationship between the input attributes, the target attributes and the segment transcoding speeds indicates an influence rule of the input and target attributes on the segment transcoding speeds. The mapping relationship may be determined by statistically analyzing rules among sample input attributes of sample videos to be transcoded, sample target attributes and sample segment transcoding speeds of the sample videos.

At block S103, the number of video segments of the video to be transcoded is determined based on a preset target transcoding speed of the video to be transcoded and the segment transcoding speed.

The preset target transcoding speed of the video to be transcoded is a speed value preset based on a transcoding requirement, which refers to a speed of processing the whole video to be transcoded in a transcoding process. The target transcoding speed being preset means that the transcoding speed of the video to be transcoded is controllable based on the transcoding requirement. The transcoding speed of the video is a quotient of dividing a video length of the video by a transcoding duration of the video. The segment transcoding speed is a quotient of dividing a segment length of the video segment by a transcoding duration of the video segment. In a process of distributed video transcoding, in order to improve the efficiency of the video transcoding, each video segment may have the same transcoding duration and the transcoding duration of each video segment may be equal to the transcoding duration of the whole video. In this way, occurrence of a condition that some nodes are in idle states since the transcoding speed at other nodes is slow to prolong the transcoding duration of the whole video may be reduced. Therefore, after the segment transcoding speed v1 of the video to be transcoded is determined, the number x of video segments of the video to be transcoded may be determined by dividing a preset target transcoding speed v2 of the video to be transcoded by the segment transcoding speed v1, that is, x=v2/v1, where x is an integer. Generally, the more the video segments, the higher the video transcoding efficiency is.

At block S104, the video to be transcoded is segmented based on a video length of the video to be transcoded and the number of video segments, to obtain the video segments.

The video to be transcoded may be segmented based on the video length of the video to be transcoded and the number of video segments, to determine a time interval corresponding to each video segment. That is, a time stamp is determined for each video segment.

At block S105, the video segments are transcoded based on the segment transcoding speed.

After transcoding of each video segment is completed to obtain multiple transcoded video segments, the multiple transcoded video segments may be gathered based on the time stamp of each video segment to obtain the transcoded video. The transcoded video may be stored or issued subsequently.

In some embodiments of the present disclosure, the segment transcoding speed of the video to be transcoded is determined based on the input attribute of the video to be transcoded and the target attribute. That is, the segment transcoding speed of the video is accurately determined based on consideration factors of fine granularity, and a foundation for reasonably determining the number of video segments is provided. The number of video segments of the video to be transcoded is determined based on the preset target transcoding speed of the video to be transcoded and the segment transcoding speed. The video to be transcoded is segmented to obtain the video segments and the video segments are transcoded. Therefore, the rationality is increased for segmenting the video in the video transcoding process and a problem existing in the prior art that the video is unreasonably divided is solved. In some embodiments of the present disclosure, the target transcoding speed of the video may be preset, such that the number of video segments may be determined based on the target transcoding speed, thereby ensuring the effective improvement of the video transcoding efficiency.

On the basis of the above, in some embodiments of the present disclosure, before the segment transcoding speed of the video to be transcoded is determined based on the input attribute and the target attribute, the method also includes obtaining resource configuration information of container instances. Correspondingly, determining the segment transcoding speed of the video to be transcoded based on the input attribute and the target attribute includes determining the segment transcoding speed of the video to be transcoded based on the input attribute, the target attribute, and the resource configuration information.

In some embodiments of the present disclosure, the container instance refers to an independent resource space for performing the video transcoding task. The independent resource space is obtained by managing and dividing the computing resources on the computing device in advance. The resource configuration information of the container instances may include configuration information of CPU, configuration information of GPU and configuration information of a computing chip. For example, the configuration information includes a model of the CPU, a main frequency of the CPU, the number of cores of the CPU, a model of the GPU, a main frequency of the CPU, the number of cores of the GPU, and a model of the computing chip.

In detail, a predetermined mapping relationship among input attributes of videos, target attributes, resource configuration information of container instances and segment transcoding speeds may be utilized to determine the segment transcoding speed of a current video to be transcoded. The mapping relationship indicates an influence rule of the input attributes of videos, the target attributes and the resource configuration information of container instances on the segment transcoding speeds. The mapping relationship may be determined by statistically analyzing rules among sample input attributes of a large amount of sample videos to be transcoded, sample target attributes, resource configuration information of container instances used during performing the transcoding task, and segment transcoding speeds of the large amount of sample videos. By considering the resource configuration information of the container instances while determining the segment transcoding speed of the video to be transcoded, the container resource may be fully used for performing the transcoding task, thereby maximizing the utilization of container resources.

Further, transcoding the video segments based on the segment transcoding speed includes calling the container instances to transcode the video segments based on the segment transcoding speed. By calling the multiple container instances simultaneously, distributed transcoding processing may be performed on the video to be transcoded, thereby improving the video transcoding efficiency.

Further, before determining the segment transcoding speed of the video to be transcoded based on the input attribute, the target attribute and the resource configuration information, the method according to embodiments of the present disclosure also includes obtaining a preset speed level of the segment transcoding speed of the video to be transcoded. Correspondingly, determining the segment transcoding speed of the video to be transcoded based on the input attribute, the target attribute and the resource configuration information includes determining the segment transcoding speed of the video to be transcoded based on the input attribute, the target attribute, the resource configuration information, and the preset speed level.

The preset speed level refers to a level of the transcoding speed set in advance, such as slowest, slower, slow, fast, faster and fastest. The video transcoding speed has a negative correlation to a video transcoding quality. Therefore, the transcoding speed level may be preset based on different transcoding requirements and the segment transcoding speed meeting the transcoding speed level may be determined. Therefore, embodiments of the present disclosure may meet different requirements.

In detail, a predetermined mapping relationship among input attributes of videos, target attributes, resource configuration information of container instances, preset speed levels, and segment transcoding speeds may be utilized to determine the segment transcoding speed of the current video to be transcoded. The predetermined mapping relationship indicates an influence rule of the input attributes of videos, the target attributes, the resource configuration information of container instances and the preset speed levels on the segment transcoding speeds. The mapping relationship may be determined by statistically analyzing rules among sample input attributes of a large amount of sample videos to be transcoded, sample target attributes, resource configuration information of container instances used during performing the video transcoding task, the speed levels, and the segment transcoding speeds of the large amount of sample videos.

Figure 3:
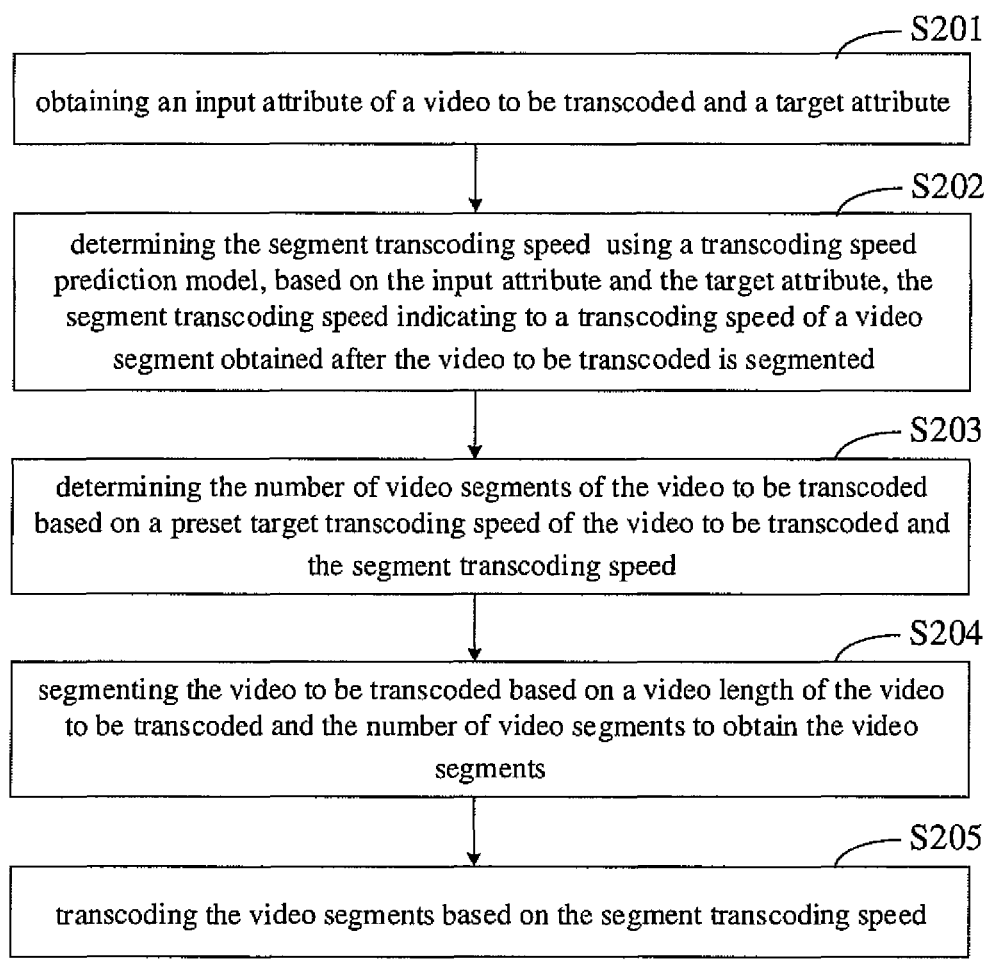
FIG. 3 is a flow chart illustrating a method for transcoding a video according to embodiments of the present disclosure.

FIG. 3 is a flow chart illustrating a method for transcoding a video according to embodiments of the present disclosure. The method illustrated in FIGS. 1 and 2 may be described in detail. Further, the method illustrated in FIG. 3 may be combined with the method illustrated in FIGS. 1 and 2, which is not limited in the disclosure. As illustrated in FIG. 3, the method may include the following.

At block S201, an input attribute of a video to be transcoded and a target attribute are obtained.

At block S202, a segment transcoding speed is determined with a transcoding speed prediction model based on the input attribute and the target attribute. The transcoding speed prediction model is trained in advance. The segment transcoding speed refers to a transcoding speed of a video segment obtained after the video to be transcoded is segmented.

In some embodiments of the present disclosure, a mapping relationship among input attributes of videos, target attributes and segment transcoding speeds may be represented by the pre-trained model. The transcoding speed prediction model may be any model with a function for predicting the segment transcoding speed.

Further, the method according to embodiments of the present disclosure may also include obtaining a sample input attribute of a sample video and a sample target attribute; marking a segment transcoding speed of the sample video to obtain a marked result; and training the transcoding speed prediction model based on the sample input attribute, the sample target attribute and the marked result. In detail, the transcoding speed prediction model may be trained based on a support vector machine (SVM) model, a random forest (RF) model or an eXtreme gradient boosting (XGBoost).

At block S203, the number of video segments of the video to be transcoded is determined based on a preset target transcoding speed of the video to be transcoded and the segment transcoding speed.

At block S204, the video to be transcoded is segmented based on a video length of the video to be transcoded and the number of video segments, to obtain the video segments.

At block S205, the video segments are transcoded based on the segment transcoding speed.

In embodiments of the present disclosure, by utilizing the transcoding speed prediction model, the segment transcoding speed of the video to be transcoded is determined based on the input attribute of the video to be transcoded and the target attribute, thereby improving the rationality and the accuracy of determining the segment transcoding speed. The number of video segments of the video to be transcoded is determined based on the preset target transcoding speed of the video to be transcoded and the segment transcoding speed, thereby improving the rationality of segmenting the video in the video transcoding process. As a result, an existing problem that the video is unreasonably segmented may be solved, the video transcoding efficiency may be improved.

On the basis of the above, it should be noted that, more factors are taken into consideration to determine the segment transcoding speed of the video to be transcoded. For example, the resource configuration information of the container instances and/or the preset speed level of the segment transcoding speed are considered. Correspondingly, during training the transcoding speed prediction model, in addition to the sample input attributes, the sample target attributes and the marked results of the sample video segments, the resource configuration information of the container instances and/or the speed levels corresponding to the segment transcoding speeds of the sample videos may also be used as inputs for training the transcoding speed prediction model to obtain a final transcoding speed prediction model, thereby improving the accuracy of predicting the segment transcoding speed by utilizing the transcoding speed prediction model.

Figure 4:
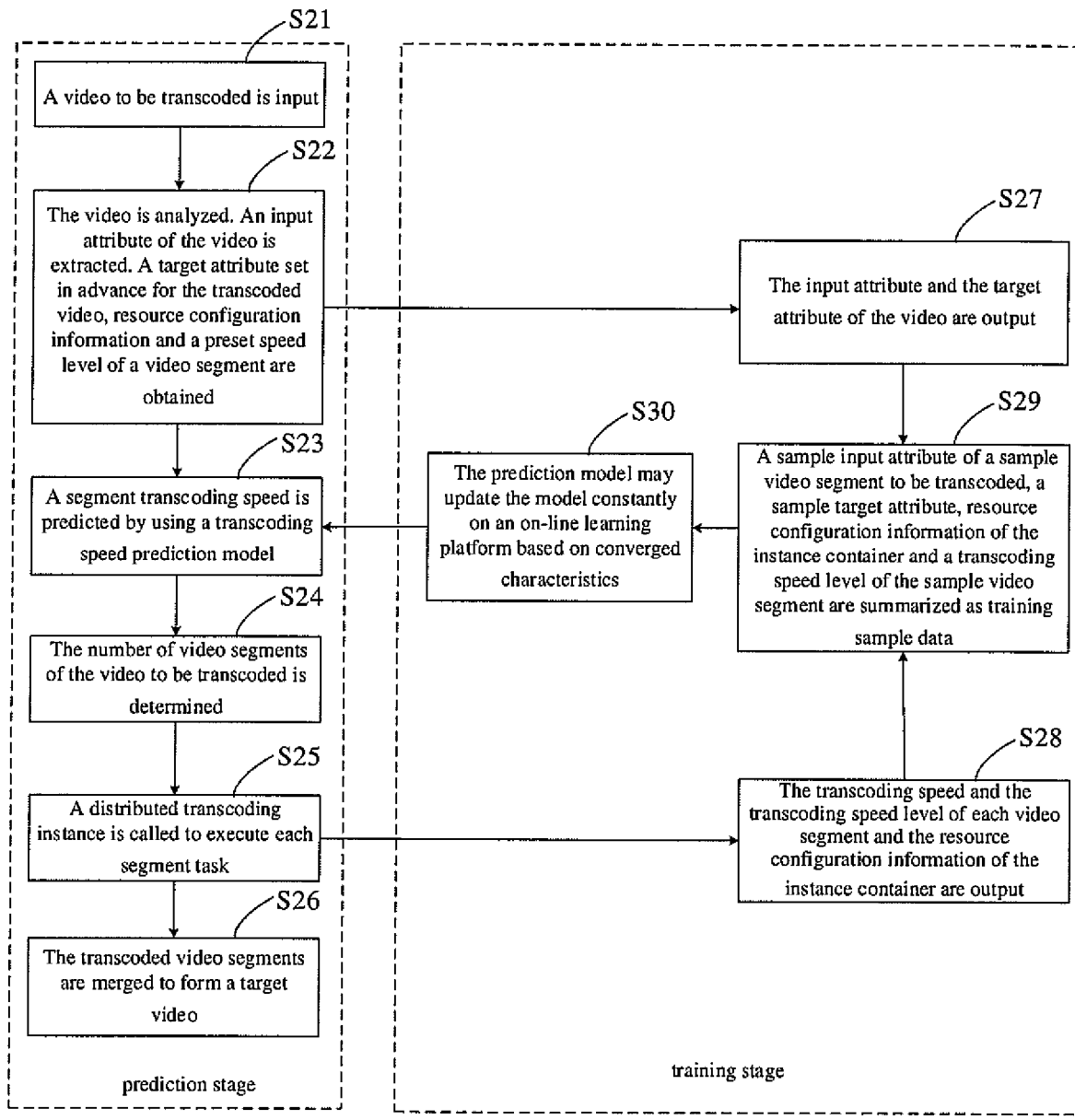
FIG. 4 is a flow chart illustrating a method for transcoding a video according to embodiments of the present disclosure.

FIG. 4 is a flow chart illustrating a method for transcoding a video according to embodiments of the present disclosure. The method in FIGS. 1 to 3 may be described in detail in FIG. 4. FIG. 4 is not understood as a detailed limitation of embodiments of the present disclosure. As illustrated in FIG. 4, the method may include a prediction stage and a training stage. In detail, the method may include the following.

At block S21, a video to be transcoded is input.

At block S22, the video is analyzed to determine an input attribute of the video. A preset target attribute, preset resource configuration information and a preset speed level of a segment transcoding speed are obtained.

As illustrated in FIG. 4, the block S22 may proceed to the block S27. At block S27, the input attribute of the video and the target attribute may be outputted as input data of the training stage of a model.

At block S23, a segment transcoding speed is predicted with a transcoding speed prediction model.

At block S24, the number of video segments of the video to be transcoded is determined.

The number of video segments of the video to be transcoded is determined based on a preset target transcoding speed of the video to be transcoded and the segment transcoding speed.

At block S25, distributed transcoding instances are called to execute transcoding tasks of video segments respectively.

In detail, the number of transcoding instances called may be equal to the number of video segments. The transcoding instances called may be configured to execute the transcoding tasks of the video segments simultaneously. The block S25 may proceed to the block S28. At block S28, the segment transcoding speed of each video segment, the transcoding speed level, and resource configuration information of the instance containers are outputted as input data of the training stage of the model. Comparing with outputting a preset speed level and preset resource configuration information before performing the transcoding task, outputting the speed level of the segment transcoding speed and the resource configuration information of the instance containers after performing the transcoding task may ensure the authenticity of the above-mentioned information. The information output at blocks S27 and S28 may be determined by analyzing a transcoding task log.

At block S26, the transcoded video segments are gathered to form a target video.

In detail, the transcoded video segments may be merged with a video editing technology based on the time stamp of each video segment.

At block S27, the input attribute of the video and the target attribute are output.

At block S28, the segment transcoding speed of each video segment, the speed level and the resource configuration information of the instance containers are output.

At block S29, sample input attributes of sample videos to be transcoded, sample target attributes, resource configuration information of instance containers and speed levels of the sample video segments are collected as training sample data.

At block S30, the transcoding speed prediction model is updated constantly by an on-line learning platform based on the collected training sample data.

In embodiments of the present disclosure, a method of reinforcement learning is employed to continuously expand the training data of the model, such that sample data is more real, and the model is continuously updated and iterated to improve the accuracy of the model. After determining that a new model is better, the new model may be downloaded and used in the prediction stage to determine the segment transcoding speed of a current video to be transcoded.

Figure 5:
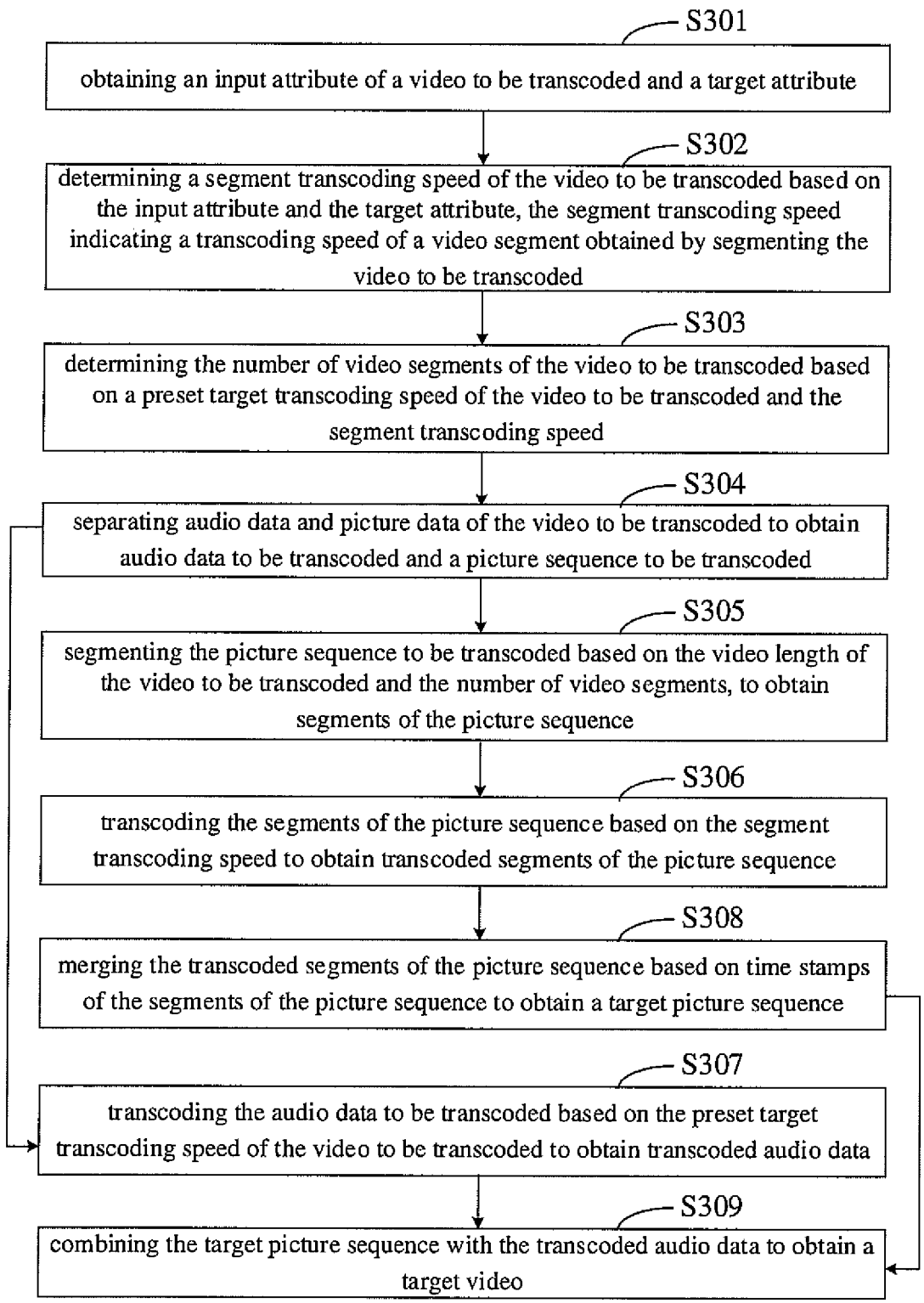
FIG. 5 is a flow chart illustrating a method for transcoding a video according to embodiments of the present disclosure.

FIG. 5 is a flow chart illustrating a method for transcoding a video according to embodiments of the present disclosure. The method in FIGS. 1 to 4 may be described in detail in FIG. 5. Further, the method in FIGS. 1 to 4 may be combined with the method illustrated in FIG. 5. As illustrated in FIG. 5, the method may include the following.

At block S301, an input attribute of a video to be transcoded and a target attribute are obtained.

For example, the input attribute includes at least one of resolution, code rate, encoder type, and complexity of a preset number of video pictures. The complexity includes a temporal complexity and a spatial complexity. The target attribute includes at least one of resolution, code rate, encoder type, and the number of key pictures.

At block S302, a segment transcoding speed of the video to be transcoded is determined based on the input attribute and the target attribute. The segment transcoding speed indicates a transcoding speed of a video segment obtained by segmenting the video to be transcoded.

At block S303, the number of video segments of the video to be transcoded is determined based on a preset target transcoding speed of the video to be transcoded and the segment transcoding speed.

At block S304, audio data and picture data of the video to be transcoded are separated to obtain audio data to be transcoded and a picture sequence to be transcoded.

In detail, audio and pictures may be extracted from the video to be transcoded with an available audio-video separation tool, to obtain the audio data to be transcoded and the picture sequence to be transcoded.

It should be noted that, the block S304 may be executed before or after the blocks S301-S303. The logical order illustrated in FIG. 5 should not be understood as a limitation to embodiments of the present disclosure. Separating the audio data and the picture sequence may be performed at any stage before segmenting the video to be transcoded, as long as segmenting only the picture sequence and not segmenting the audio data.

At block S305, the picture sequence to be transcoded is segmented based on a video length of the video to be transcoded and the number of video segments, to obtain segments of the picture sequence.

In detail, the picture sequence to be transcoded is segmented based on the video length of the video to be transcoded and the number of video segments, to determine a time interval corresponding to each segment of the picture sequence. That is, a time stamp is determined for each segment of the picture sequence.

At block S306, the segments of the picture sequence are transcoded based on the segment transcoding speed to obtain transcoded segments of the picture sequence.

The block S306 may proceed to the block S308. At block S308, the transcoded segments of the picture sequence are merged.

At block S307, the audio data to be transcoded is transcoded based on the preset target transcoding speed of the video to be transcoded to obtain transcoded audio data.

In some embodiments of the present disclosure, reasons of not segmenting the audio data include the following. If the audio data is segmented and audio segments are transcoded into some specific formats, such as an AAC format, impulse noise may be presented at a junction of audio segments. The impulse noise is determined by a specific coding standard, which affects the quality of the transcoded audio. Therefore, in the present disclosure, the whole audio is transcoded based on the preset target transcoding speed of the video to be transcoded without segmenting the audio, which may not only improve the quality of the transcoded audio, but also enable a transcoding duration of the audio data is the same as a transcoding duration of the picture sequence.

At block S308, the transcoded segments of the picture sequence are merged based on time stamps of the segments of the picture sequence to obtain a target picture sequence.

At block S309, the target picture sequence is combined with the transcoded audio data to obtain a target video.

In detail, an available video synthesis tool may be used to combine a target picture sequence with the transcoded audio data, to obtain the transcoded video.

With the embodiments of the present disclosure, the audio data and the picture data of the video to be transcoded are separated to obtain the audio data to be transcoded and the picture sequence to be transcoded. The picture sequence to be transcoded is segmented and the segments of the picture sequence are transcoded to obtain transcoded segments of the picture sequence. The audio data to be transcoded is transcoded. The transcoded video is obtained by combining the transcoded segments of the picture sequence and the transcoded audio data. In this way, not only the quality of the transcoded audio is improved, but also the video transcoding efficiency is improved.

Figure 6:
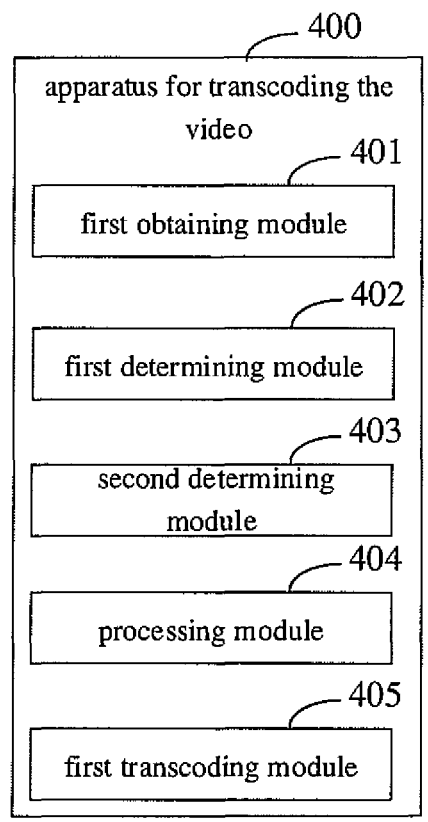
FIG. 6 is a block diagram illustrating an apparatus for transcoding a video according to embodiments of the present disclosure.

FIG. 6 is a block diagram illustrating an apparatus for transcoding a video according to an embodiment of the present disclosure. In embodiments of the present disclosure, the apparatus may be applicable to a condition for transcoding a video. In detail, the apparatus may be applicable to a condition for video cloud transcoding, that is, a cloud computing infrastructure is employed for the video transcoding. The apparatus according to embodiments of the present disclosure may be implemented by software and/or hardware, and may be integrated on any electronic device with a computing capability, such as a server.

As illustrated in FIG. 6, the apparatus 400 for transcoding the video according to embodiments of the present disclosure may include a first obtaining module 401, a first determining module 402, a second determining module 403, a processing module 404, and a first transcoding module 405.

The first obtaining module 401 is configured to obtain an input attribute of a video to be transcoded and a target attribute.

The first determining module 402 is configured to determine a segment transcoding speed of the video to be transcoded based on the input attribute and the target attribute. The segment transcoding speed indicates a transcoding speed of a video segment obtained by segmenting the video to be transcoded.

The second determining module 403 is configured to determine the number of video segments of the video to be transcoded based on a preset target transcoding speed of the video to be transcoded and the segment transcoding speed.

The processing module 404 is configured to segment the video to be transcoded based on a video length of the video to be transcoded and the number of video segments to obtain the video segments.

The first transcoding module 405 is configured to transcode the video segments based on the segment transcoding speed.

In embodiments of the present disclosure, the input attribute includes at least one of resolution, code rate, encoder type, and complexity of a preset number of video pictures. The complexity includes a temporal complexity and a spatial complexity.

The target attribute includes at least one of resolution, code rate, encoder type, and the number of key pictures.

In embodiments of the present disclosure, the apparatus also includes a second obtaining module, configured to obtain resource configuration information of container instances.

The first determining module 402 is configured to determine the segment transcoding speed of the video to be transcoded based on the input attribute, the target attribute, and the resource configuration information.

In embodiments of the present disclosure, the first transcoding module 405 is configured to: call the container instances to transcode the video segments based on the segment transcoding speed.

In embodiments of the present disclosure, the apparatus also includes a third obtaining module, configured to obtain a preset speed level of the segment transcoding speed of the video to be transcoded.

The first determining module 402 is configured to determine the segment transcoding speed of the video to be transcoded based on the input attribute, the target attribute, the resource configuration information, and the preset speed level.

In embodiments of the present disclosure, the first determining module 402 is configured to: determine the segment transcoding speed using a transcoding speed prediction model based on the input attribute and the target attribute.

In embodiments of the present disclosure, the apparatus also includes a fourth obtaining module, a marking module, and a training module.

The fourth obtaining module is configured to obtain sample input attributes of sample video segments and sample target attributes.

The marking module is configured to mark segment transcoding speeds of the sample videos to obtain marked results.

The training module is configured to train the transcoding speed prediction model based on the sample input attributes, the sample target attributes and the marked results.

In embodiments of the present disclosure, the apparatus also includes a separating module. The separating module is configured to separate audio data and picture data of the video to be transcoded to obtain audio data to be transcoded and a picture sequence to be transcoded before the video to be transcoded is segmented based on the video length of the video to be transcoded and the number of video segments.

The processing module 404 is configured to segment the picture sequence to be transcoded based on the video length of the video to be transcoded and the number of video segments, to obtain segments of the picture sequence.

The first transcoding module 405 is configured to transcode the segments of the picture sequence based on the segment transcoding speed to obtain transcoded segments of the picture sequence.

In embodiments of the present disclosure, the apparatus also includes a second transcoding module, configured to transcode the audio data to be transcoded based on the preset target transcoding speed of the video to be transcoded to obtain transcoded audio data.

In embodiments of the present disclosure, the apparatus also includes a third determining module and a fourth determining module.

The third determining module is configured to merge transcoded segments of the picture sequence based on time stamps of the segments of the picture sequence to obtain a target picture sequence.

The fourth determining module is configured to combine the target picture sequence with the transcoded audio data to obtain a target video.

The apparatus 400 for transcoding the video according to embodiments of the present disclosure may execute the method for transcoding the video according to embodiments of the present disclosure, and has corresponding functional modules for executing the method and beneficial effects. Content not described in detail in the apparatus embodiment of the present disclosure may refer to the description in any method embodiment of the present disclosure.

According to embodiments of the present disclosure, embodiments of the present disclosure also provides an electronic device and a readable storage medium.

Figure 7:
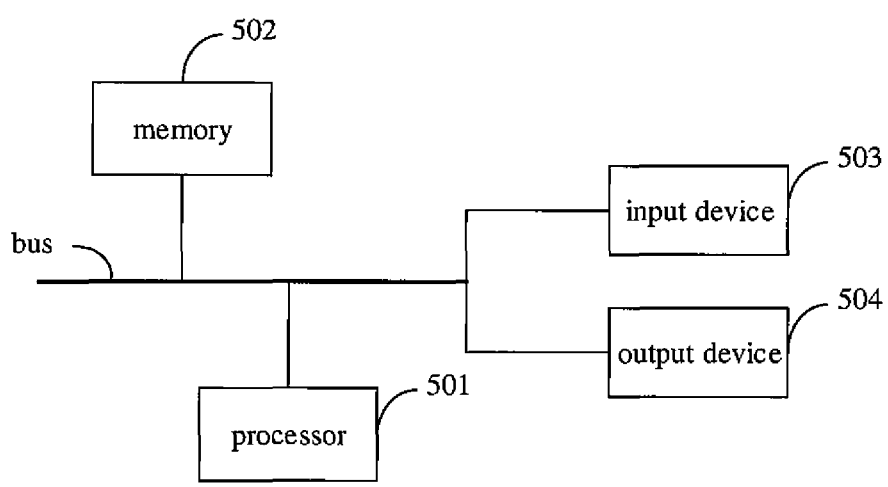
FIG. 7 is a block diagram illustrating an electronic device according to embodiments of the present disclosure.

As illustrated in FIG. 7, FIG. 7 is a block diagram illustrating an electronic device capable of implementing a method for transcoding a video according to embodiments of the present disclosure. The electronic device aims to represent various forms of digital computers, such as a laptop computer, a desktop computer, a workstation, a personal digital assistant, a server, a blade server, a mainframe computer and other suitable computer. The electronic device may also represent various forms of mobile devices, such as personal digital processing, a cellular phone, a smart phone, a wearable device and other similar computing device. The components, connections and relationships of the components, and functions of the components illustrated herein are merely examples, and are not intended to limit the embodiments of the present disclosure described and/or claimed herein.

As illustrated in FIG. 7, the electronic device includes: one or more processors 501, a memory 502, and interfaces for connecting various components, including a high-speed interface and a low-speed interface. Various components are connected to each other via different buses, and may be mounted on a common main board or in other ways as required. The processor may process instructions executed within the electronic device, including instructions stored in or on the memory to display graphical information of the GUI (graphical user interface) on an external input/output device (such as a display device coupled to an interface). In other implementations, multiple processors and/or multiple buses may be used together with multiple memories if desired. Similarly, multiple electronic devices may be connected, and each device provides some necessary operations (for example, as a server array, a group of blade servers, or a multiprocessor system). In FIG. 7, a processor 501 is taken as an example.

The memory 502 is a non-transitory computer readable storage medium provided by embodiments of the present disclosure. The memory is configured to store instructions executable by at least one processor, to enable the at least one processor to execute the method for transcoding the video provided by embodiments of the present disclosure. The non-transitory computer readable storage medium provided by embodiments of the present disclosure is configured to store computer instructions. The computer instructions are configured to enable a computer to execute the method for transcoding the video provided by embodiments of the present disclosure.

As the non-transitory computer readable storage medium, the memory 502 may be configured to store non-transitory software programs, non-transitory computer executable programs and modules, such as program instructions/module (such as the first obtaining module 401, the first determining module 402, the second determining module 403, the processing module 404, and the first transcoding module 405 illustrated in FIG. 6) corresponding to the method for transcoding the video according to embodiments of the present disclosure. The processor 501 is configured to execute various functional applications and data processing of the server by operating non-transitory software programs, instructions and modules stored in the memory 502, that is, implements the method for transcoding the video according to the above method embodiments.

The memory 502 may include a storage program region and a storage data region. The storage program region may store an application required by an operating system and at least one function. The storage data region may store data created according to predicted usage of the electronic device based on the semantic representation. In addition, the memory 502 may include a high-speed random-access memory, and may also include a non-transitory memory, such as at least one disk memory device, a flash memory device, or other non-transitory solid-state memory device. In some embodiments, the memory 502 may optionally include memories remotely located to the processor 501, and these remote memories may be connected to the electronic device via a network. Examples of the above network include, but are not limited to, an Internet, an intranet, a local area network, a mobile communication network and combinations thereof.

The electronic device capable of implementing the method for transcoding the video may also include: an input device 503 and an output device 504. The processor 501, the memory 502, the input device 503, and the output device 504 may be connected via a bus or in other means. In FIG. 7, the bus is taken as an example.

The input device 503 may receive inputted digital or character information, and generate key signal input related to user setting and function control of the electronic device capable of implementing the method for transcoding the video, such as a touch screen, a keypad, a mouse, a track pad, a touch pad, an indicator stick, one or more mouse buttons, a trackball, a joystick and other input device. The output device 504 may include a display device, an auxiliary lighting device (e.g., LED), a haptic feedback device (e.g., a vibration motor), and the like. The display device may include, but be not limited to, a liquid crystal display (LCD), a light emitting diode (LED) display, and a plasma display. In some embodiments, the display device may be the touch screen.

The various implementations of the system and technologies described herein may be implemented in a digital electronic circuit system, an integrated circuit system, an application specific ASIC (application specific integrated circuit), a computer hardware, a firmware, a software, and/or combinations thereof. These various implementations may include: being implemented in one or more computer programs. The one or more computer programs may be executed and/or interpreted on a programmable system including at least one programmable processor. The programmable processor may be a special purpose or general purpose programmable processor, may receive data and instructions from a storage system, at least one input device, and at least one output device, and may transmit data and the instructions to the storage system, the at least one input device, and the at least one output device.

These computing programs (also called programs, software, software applications, or codes) include machine instructions of programmable processors, and may be implemented by utilizing high-level procedures and/or object-oriented programming languages, and/or assembly/machine languages. As used herein, the terms "machine readable medium" and "computer readable medium" refer to any computer program product, device, and/or apparatus (such as, a magnetic disk, an optical disk, a memory, a programmable logic device (PLD)) for providing machine instructions and/or data to a programmable processor, including a machine readable medium that receives machine instructions as a machine readable signal. The term "machine readable signal" refers to any signal for providing the machine instructions and/or data to the programmable processor.

To provide interaction with a user, the system and technologies described herein may be implemented on a computer. The computer has a display device (such as, a CRT (cathode ray tube) or a LCD (liquid crystal display) monitor) for displaying information to the user, a keyboard and a pointing device (such as, a mouse or a trackball), through which the user may provide the input to the computer. Other types of devices may also be configured to provide interaction with the user. For example, the feedback provided to the user may be any form of sensory feedback (such as, visual feedback, auditory feedback, or tactile feedback), and the input from the user may be received in any form (including acoustic input, voice input or tactile input).

The system and technologies described herein may be implemented in a computing system including a background component (such as, a data server), a computing system including a middleware component (such as, an application server), or a computing system including a front-end component (such as, a user computer having a graphical user interface or a web browser through which the user may interact with embodiments of the system and technologies described herein), or a computing system including any combination of such background component, the middleware components and the front-end component. Components of the system may be connected to each other via digital data communication in any form or medium (such as, a communication network). Examples of the communication network include a local area network (LAN), a wide area networks (WAN), and the Internet.

The computer system may include a client and a server. The client and the server are generally remote from each other and generally interact via the communication network. A relationship between the client and the server is generated by computer programs operated on a corresponding computer and having a client-server relationship with each other.

In embodiments of the present disclosure, firstly, the segment transcoding speed of the video to be transcoded is determined based on the input attribute of the video to be transcoded and the target attribute. Then, the number of video segments of the video to be transcoded is determined based on the preset target transcoding speed and the segment transcoding speed. The video to be transcoded is segmented and transcoding is performed on the video segments, thereby improving the rationality of the video segment in the video transcoding process. The transcoding speed of a whole video may be preset, which ensures the effective improvement of the video transcoding efficiency.

It should be understood that, steps may be reordered, added or deleted by utilizing flows in the various forms illustrated above. For example, the steps described in the present disclosure may be executed in parallel, sequentially or in different orders, so long as desired results of the technical solution disclosed in embodiments of the present disclosure may be achieved, there is no limitation here.

The above detailed implementations do not limit the protection scope of the present disclosure. It should be understood by the skilled in the art that various modifications, combinations, sub-combinations and substitutions may be made based on design requirements and other factors. Any modification, equivalent substitution and improvement made within the spirit and the principle of the present disclosure shall be included in the protection scope of present disclosure.

What is claimed is:

1. A method for transcoding a video, comprising:
obtaining resource configuration of container instances;
obtaining an input attribute of a video and a target attribute;
determining a segment transcoding speed based on the input attribute, the target attribute and the resource configuration information, the segment transcoding speed indicating a transcoding speed of a video segment obtained by segmenting the video;
determining the number of video segments based on a preset target transcoding speed and the segment transcoding speed;
segmenting the video based on a video length of the video and the number of video segments to obtain the video segments; and
transcoding the video segments based on the segment transcoding speed.

2. The method of claim 1, wherein the input attribute comprises at least one of resolution, code rate, encoder type, and complexity of a preset number of video pictures, the complexity comprising a temporal complexity and a spatial complexity; and
the target attribute comprises at least one of resolution, code rate, encoder type, and the number of key pictures.

3. The method of claim 1, wherein transcoding the video segments based on the segment transcoding speed comprises:
calling the container instances to transcode the video segments based on the segment transcoding speed.

4. The method of claim 1, further comprising:
obtaining a preset speed level of the segment transcoding speed; and
determining the segment transcoding speed based on the input attribute, the target attribute, the resource configuration information, and the preset speed level.

5. The method of claim 1, wherein determining the segment transcoding speed of the video based on the input attribute and the target attribute comprises:
determining the segment transcoding speed using a transcoding speed prediction model, based on the input attribute and the target attribute.

6. The method of claim 5, wherein the transcoding speed prediction model is trained by:
obtaining sample input attributes of sample videos and sample target attributes;
marking segment transcoding speeds of the sample videos to obtain marked results; and
training the transcoding speed prediction model based on the sample input attributes, the sample target attributes and the marked results.

7. The method of claim 1, further comprising:
separating audio data and picture data of the video to obtain audio data and a picture sequence;
segmenting the picture sequence based on the video length and the number of video segments, to obtain segments of the picture sequence; and
transcoding the segments of the picture sequence based on the segment transcoding speed to obtain transcoded segments of the picture sequence.

8. The method of claim 7, further comprising:
transcoding the audio data based on the preset target transcoding speed to obtain transcoded audio data.

9. The method of claim 8, further comprising:
merging the transcoded segments of the picture sequence based on time stamps of the segments of the picture sequence to obtain a target picture sequence; and
combining the target picture sequence with the transcoded audio data to obtain a target video.

10. An electronic device, comprising:
at least one processor; and
a memory, communicatively coupled to the at least one processor,
wherein the memory is configured to store instructions executable by the at least one processor, and when the instructions are executed by the at least one processor, the at least one processor is configured to:
obtain resource configuration information of container instance;
obtain an input attribute of a video and a target attribute;
determine a segment transcoding speed based on the input attribute, the target attribute and the resource configuration information, the segment transcoding speed indicating a transcoding speed of a video segment obtained by segmenting the video;
determine the number of video segments based on a preset target transcoding speed and the segment transcoding speed;
segment the video based on a video length of the video and the number of video segments to obtain the video segments; and
transcode the video segments based on the segment transcoding speed.

11. The electronic device of claim 10, wherein the input attribute comprises at least one of resolution, code rate, encoder type, and complexity of a preset number of video pictures, the complexity comprising a temporal complexity and a spatial complexity; and
the target attribute comprises at least one of resolution, code rate, encoder type, and the number of key pictures.

12. The electronic device of claim 10, wherein the at least one processor is further configured to:
call the container instances to transcode the video segments based on the segment transcoding speed.

13. The electronic device of claim 10, wherein the at least one processor is further configured to:
obtain a preset speed level of the segment transcoding speed; and
determine the segment transcoding speed based on the input attribute, the target attribute, the resource configuration information, and the preset speed level.

14. The electronic device of claim 10, wherein the at least one processor is further configured to:
determine the segment transcoding speed using a transcoding speed prediction model, based on the input attribute and the target attribute.

15. The electronic device of claim 10, wherein the at least one processor is further configured to:
separate audio data and picture data of the video to obtain audio data and a picture sequence;
segment the picture sequence based on the video length and the number of video segments, to obtain segments of the picture sequence; and
transcode the segments of the picture sequence based on the segment transcoding speed to obtain transcoded segments of the picture sequence.

16. The electronic device of claim 15, wherein the at least one processor is further configured to:
transcode the audio data based on the preset target transcoding speed to obtain transcoded audio data.

17. The electronic device of claim 16, wherein the at least one processor is further configured to:
- merge the transcoded segments of the picture sequence based on time stamps of the segments of the picture sequence to obtain a target picture sequence; and
- combine the target picture sequence with the transcoded audio data to obtain a target video.

18. A non-transitory computer readable storage medium having computer instructions stored thereon, wherein the computer instructions are configured to enable a computer to execute a method for transcoding a video, the method comprising:
- obtaining resource configuration information of container instances;
- obtaining an input attribute of a video and a target attribute;
- determining a segment transcoding speed based on the input attribute, the target attribute and the resource configuration information, the segment transcoding speed indicating a transcoding speed of a video segment obtained by segmenting the video;
- determining the number of video segments based on a preset target transcoding speed and the segment transcoding speed;
- segmenting the video based on a video length of the video and the number of video segments to obtain the video segments; and
- transcoding the video segments based on the segment transcoding speed.

* * * * *